United States Patent Office 2,733,995
Patented Feb. 7, 1956

2,733,995

POLYVINYL ACETATE CEMENT COMPOSITIONS

William D. Robinson, Niagara Falls, N. Y., assignor to E. I. du Pont de Nemours and Company, Wilmington, Del., a corporation of Delaware No Drawing. Application December 6, 1952,
Serial No. 324,599

7 Claims. (Cl. 106—90)

This invention relates to coatings suitable for masonry, particularly concrete, surfaces. More particularly it relates to coating compositions or paints suitable for dispersion in water and containing water dispersible polyvinyl acetate and a hydraulic cement.

Paints made of cement and water have found utility both for protective and decorative coatings on masonry surfaces. These paints or coatings are suspensions or dispersions of hydraulic cements, especially Portland cement in water. The dispersions usually contain other solid additives in addition to the cement such as pigments, hydrated lime, stearate salts and the like. These coatings generally do not adhere well to smooth dense masonry surfaces. Since a prime purpose of a coating on masonry is to seal the surface against water and water vapor penetration it is evident that poor bonding of the coat or paint to the surface is very undesirable. Furthermore, these coatings are relatively very brittle and this defect combined with shrinkage during the drying of the coating results in the development of the fine checkings or cracks or crazing which increases the moisture permeability of the resultant coating.

Another great disadvantage of the cement-type of coatings is that their application requires much care and labor to assure good results. The surface to be coated must be made thoroughly wet before applying the paint. Then the painted surface must be kept damp or moist during the drying and curing periods.

Polyvinyl acetate emulsions can be added to cement paints or coating compositions and this will eliminate the need for wetting the masonry surface prior to application. However, the cement paints containing the aqueous polyvinyl acetate dispersions have poor shelf stability. The cement components have an adverse effect on the protective colloids or dispersing agents in the polyvinyl acetate dispersions.

Accordingly it is the objective of this invention to prepare cement-water coating compositions which will have good shelf life in the dry form. It is another objective to produce compositions which on mixing or dispersing in water will permit the application to concrete or masonry surfaces of coatings having superior properties of adhesion and plasticity and which therefore exhibit greater resistance to the penetration of water or water vapor. A further objective is the preparation of stable dry paint compositions which require only the addition of water prior to applying them to masonry surfaces. Other objectives will become clear as the invention is further described.

It has been discovered that these objectives can generally be achieved by adding water dispersible dry polyvinyl acetate to the dry components of a hydraulic cement and any desired dry additives such as pigments. Such mixtures have long shelf stability and on mixing with water can be applied to dry masonry walls by simple painting operations. The resulting coatings will dry and cure without the need of maintaining special moisture conditions. The coatings will have good plasticity and adhesion and provide a high degree of resistance to penetration by water or water vapor.

The water dispersible polyvinyl acetate for formulation with dry cement is a fine dry powder containing sufficient dispersing agent to make it redispersible on addition of water. A preferred method of making water dispersible polyvinyl acetate involves the polymerization of vinyl acetate in the presence of about 6% polyvinyl alcohol based on the final polyvinyl acetate dry powder. The polyvinyl acetate emulsion can be spray dried in a hot gas to produce the dry powder. However, this invention is not limited to any specific dispersing agent in the polyvinyl acetate since other agents will be suitable provided they make possible the redispersion of the powdered polymer in water.

Many formulations involving the use of water redispersible polyvinyl acetate and hydraulic cement with or without other additives such as pigments are possible. The following examples will illustrate the principle underlying my invention.

EXAMPLE 1

The following compositions were prepared by mixing and grinding the dry ingredients together and then adding the water with good agitation to disperse the mixture.

Composition A

| | Parts by weight |
|---|---|
| Portland cement | 80 |
| Hydrated lime | 15 |
| Titanium dioxide | 5 |
| Polyvinyl acetate spray-dried emulsion | 19.95 |
| Water | 100 |

Total solids—54.3%

Composition B

| | Parts by weight |
|---|---|
| Portland cement | 80 |
| Hydrated lime | 15 |
| Titanium dioxide | 5 |
| Water | 84 |

Total solids—54.3%

Composition B was applied by a brush to a dry concrete surface and allowed to dry 24 hours at room temperature. Similar coatings were made using Composition A. The coating obtained using Composition B showed very poor adhesion, flaking off when the surface was rubbed gently. On the other hand, films of Composition A exhibited excellent adhesion, withstanding scraping to effect removal.

EXAMPLE 2

The following composition was prepared using the procedure described above.

Composition C

| | Parts by weight |
|---|---|
| White Portland cement | 212.5 |
| Hydrated lime | 25.0 |
| Titanium dioxide | 12.5 |
| Polyvinyl acetate spray-dried emulsion | 50.4 |
| Water | 197.0 |

A cinder block was coated with the above paint using a stiff bristle brush to work the paint into the block. The coating was allowed to dry for three days and a second coat was then applied in a similar manner.

The effectiveness of the coating as a seepage sealant was tested as follows. The coated block was assembled between two steel plates using soft rubber as a gasket material. The top steel plate was fitted with a glass tube through which water could be added. Water was added slowly through the tube into the hollow portion of the cinder block to displace the air, then an 8-foot head of water was applied. The rate of seepage was determined by measusing the time interval required for a 12-inch drop in head of water. Knowing the volume of the water contained per inch in the glass tube above the block and the area of the coated cinder block, the rate of seepage could be easily calculated. The rate was expressed in liters/sq. ft./hour at 7-8 ft. head of water.

In the table are shown the results of seepage tests carried out on Composition C as well as proprietary paint of a cementitous nature.

TABLE

| Paint: | Rate of seepage |
|---|---|
| None | So great, could not maintain an 8-ft. head of water. |
| Composition C | 0.143 liters/sq. ft./hr. |
| Proprietary paint A | 0.250 liter/sq. ft./hr. |

It can be seen that the composition of this invention is quite effective as a seepage sealant.

In a very simple formulation of this invention 250 parts of a high lime Portland cement, known in the trade as "Brixment" cement was mixed with 500 parts of polyvinyl acetate and 150 parts of water. All parts are on a weight basis. The rate of seepage of water for a cinder block coated with this composition was 0.06 liter per square foot with an 8-foot head of water.

The conditions used to spray-dry the polyvinyl acetate emulsion employed in this invention were as follows: the solids content of the emulsion was 55% of which about 3% was polyvinyl alcohol added as a redispersing agent; inlet air temperature 850–900° F.; feed rate of 20 lbs. of polyvinyl acetate emulsion (dry basis) per hour; exit air temperature 130–140° F. The final spray-dried product is a fine, white, free-flowing powder with a bulk density of 0.55. A 55% solids dispersion in water has a viscosity of 980 centipoises (Brookfield) and a pH of 6.6, after being thoroughly agitated for 30 to 60 minutes.

The spray-drying step can be accomplished at any conventional drying temperatures. For example, temperatures from 600 to 1000° F. may be used.

The amount of spray-dried polyvinyl acetate emulsion used can be varied within wide limits. For example, the ratio of dry polyvinyl acetate emulsion to the inorganic ingredients can vary from 1 to 1 to 1 to 10 without adverse effect. However, in the preferred embodiment of this invention the ratio of dry polyvinyl acetate emulsion to the inorganic ingredients is from 1 to 4 to 1 to 6 by weight.

The cement portion of the paint can consist of straight Portland cement or other hydraulic cement and may contain other modifiers including pigments, lime and/or siliceous sand. It may also contain water-proofing salts such as calcium stearate. The pigments which may be used include titanium dioxide, mica, lithopone, zinc sulfide, etc. The ratio of cement modifiers can be varied but the Portland cement content should not be less than 65% of the solids portion of the paint.

The mixtures of the dry components of any of these formulations containing a dry redispersible polyvinyl acetate can be stored indefinitely prior to use if kept out of contact with water.

I claim:

1. A substantially anhydrous coating composition consisting essentially of one part by weight of water dispersible polyvinyl acetate and one to ten parts by weight of a hydraulic cement.

2. A substantially anhydrous coating composition consisting essentially of one part by weight of water dispersible polyvinyl acetate and one to ten parts by weight of Portland cement.

3. A substantially anhydrous coating composition consisting essentially of more than 5% by weight of water dispersible polyvinyl acetate, of at least 65% by weight of hydraulic cement and of pigment.

4. A substantially anhydrous coating composition consisting essentially of more than 5% by weight of water dispersible polyvinyl acetate, of at least 65% by weight of hydraulic cement, of hydrated lime and of pigment.

5. A substantially anhydrous coating composition consisting essentially of more than 5% by weight of water dispersible polyvinyl acetate, at least 65% by weight of Portland cement, of hydrated lime and of titanium dioxide.

6. A substantally anhydrous coating composition consisting essentially of water dispersible polyvinyl acetate, at least 65% by weight of hydraulic cement and of pigment, said polyvinyl acetate comprising more than 5% by weight of the composition.

7. A substantially anhydrous coating composition consisting essentially of water dispersible polyvinyl acetate, at least 65% by weight of Portland cement, of hydrated lime, of siliceous sand and of titanium dioxide, said polyvinyl acetate comprising more than 5% by weight of the composition.

References Cited in the file of this patent

UNITED STATES PATENTS

| 1,749,923 | Reardon | Mar. 11, 1930 |
| 2,284,023 | Scripture | May 26, 1942 |
| 2,491,487 | Faulwetter | Dec. 20, 1949 |

OTHER REFERENCES

Gregory, T. C.: "Uses and Applications of Chemicals and Related Materials," Reinhold Publishing Corp., New York, N. Y. (1939), 472.